United States Patent
Cohen (10) Patent No.: US 8,342,853 B2
(45) Date of Patent: Jan. 1, 2013

(54) SYSTEM FOR DISPLAYING AND INTERACTING WITH PALPATABLE FEATURE

(75) Inventor: Robert Cohen, Kensington, MD (US)

(73) Assignee: Immersion Corporation, San Jose, CA (US)

( * ) Notice: Subject to any disclaimer, the term of this patent is extended or adjusted under 35 U.S.C. 154(b) by 537 days.

(21) Appl. No.: 12/431,722

(22) Filed: Apr. 28, 2009

(65) Prior Publication Data

US 2010/0273135 A1  Oct. 28, 2010

(51) Int. Cl.
*G09B 23/28* (2006.01)

(52) U.S. Cl. ............... 434/275; 434/267; 434/272

(58) Field of Classification Search ............ 434/262, 434/267, 268, 272, 275
See application file for complete search history.

(56) References Cited

U.S. PATENT DOCUMENTS

| | | | |
|---|---|---|---|
| 2,207,153 A * | 7/1940 | Judovich | 434/272 |
| 3,520,071 A * | 7/1970 | Clark et al. | 434/265 |
| 3,662,076 A | 5/1972 | Gordon et al. | |
| 4,380,439 A * | 4/1983 | Kreitenberg | 434/268 |
| 5,821,920 A | 10/1998 | Rosenberg et al. | |
| 5,844,392 A | 12/1998 | Peurach et al. | |
| 5,947,744 A * | 9/1999 | Izzat | 434/272 |
| 6,106,301 A | 8/2000 | Merril | |
| 6,470,302 B1 | 10/2002 | Cunningham et al. | |
| 7,114,954 B2 * | 10/2006 | Eggert et al. | 434/262 |
| 7,289,106 B2 | 10/2007 | Bailey et al. | |
| 7,308,831 B2 | 12/2007 | Cunningham et al. | |
| 2005/0219205 A1 | 10/2005 | Bailey et al. | |
| 2007/0117077 A1 | 5/2007 | Gordon et al. | |

FOREIGN PATENT DOCUMENTS
WO  WO-97/05592  2/1997

OTHER PUBLICATIONS
International Search Report, Int'l Appl No. PCT/US2010/032377 Jun. 18, 2010.

* cited by examiner

*Primary Examiner* — Gene Kim
*Assistant Examiner* — Joseph B Baldori
(74) *Attorney, Agent, or Firm* — Medler Ferro PLLC (57) ABSTRACT

A training aid for of a medical procedure where a substance is injected under the skin is disclosed that provides a user with the sensation of "pushing" the substance under the skin to smooth out raised areas. The training apparatus includes an artificial skin area with a raised feature protruding there from that is provided by cam-driven lifters positioned under the artificial skin area. The raised feature simulates the injected substance and may be touched and manipulated by the user.

10 Claims, 7 Drawing Sheets

SYSTEM FOR DISPLAYING AND INTERACTING WITH PALPATABLE FEATURE

FIELD OF THE INVENTION

The invention relates generally to medical simulation systems, and more particularly to a medical simulation apparatus that allows palpation of a simulated wheal under simulated skin and provides haptic feedback.

BACKGROUND OF THE INVENTION

Dermal fillers are being used more and more to help reverse the changes associated with aging. The goal of dermal fillers is to return the dermis, particularly on the face, to its original youthful state. As such, dermal fillers are being used to reduce or eliminate wrinkles, raise scar depressions, enhance lips, and replace soft-tissue volume loss. Dermal fillers are injected under the skin of a patient and correct placement is crucial to avoid undesirable results. For instance, dermal fillers that are injected too superficially may result in the patient seeing the filler product through the epidermis, whereas dermal fillers injected too deeply may result in the filler product not producing the desired cosmetic correction. In addition, some palpation and/or manipulation of the injected dermal filler may be necessary to achieve/assure optimal results.

As with most medical procedures, training is important to obtain an acceptable level of proficiency and to avoid unintended consequences. Training via seminars with and without live or video observation is currently a primary means for a practitioner to gain experience but is less than optimal. "Hands-on" training may be more desirable, yet is likely impractical for a great percentage of practitioners due to consent and liability issues pertaining thereto. Consequently, a medical simulation for simulating a dermal filler injection procedure where the practitioner can simulate the injection of the substance under a patient's skin while palpating a simulated wheal created by the injected substance would be a useful training aid.

BRIEF SUMMARY OF THE INVENTION

Embodiments hereof are directed to an apparatus for training a medical procedure where a substance is to be injected under the skin. The apparatus provides a user with the sensation of "pushing" the substance under the skin to smooth out raised areas. The apparatus includes an outer flexible membrane that simulates skin having a palpation region to be palpated. A cam palpator having a set of lifters operably contacting a set of cams rotated by a cam shaft is disposed under the palpation region of the outer membrane such that the lifters are used to create a raised feature in the palpation region to be touched by the user. A motor is operably coupled to the cam shaft and has a position sensor operably coupled thereto that is configured to send a signal based on a rotational position of a drive shaft of the motor to a simulation. In response to a user interaction, such as a simulated injection, a region of interest is raised in the palpation region by the cam palpator mechanism, wherein a signal from the position sensor coupled with commands from the simulation cause the region of interest in the palpable region to be presented to the user.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of embodiments hereof are in the context of a training apparatus for simulating the injection of a substance under the skin, the invention may also be adapted for use as a training aid for other medical procedures where it is deemed useful. Furthermore, there is no intention to be bound by any expressed or implied theory presented in the preceding technical field, background, brief summary or the following detailed description.

Figure 1:
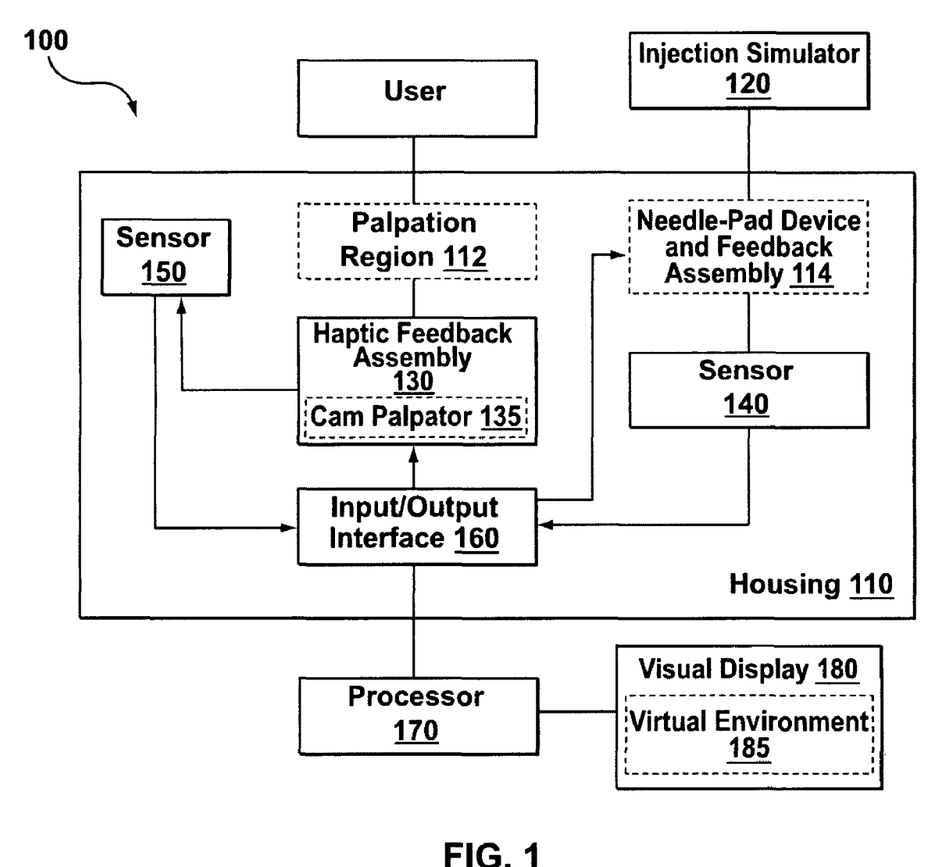
FIG. 1 shows a block diagram of a training system having a palpation region in accordance with an embodiment hereof.

FIG. 1 shows a block diagram of a training system having a palpation region in accordance with an embodiment hereof. As shown in FIG. 1, training system 100 includes housing 110, needle-pad device and feedback assembly 114, injection simulator 120, haptic feedback assembly 130, sensors 140 and 150, input/output interface 160, processor 170 and visual display 180. Housing 110 includes a palpation region 112, which is felt by a user, haptic feedback assembly 130 includes a cam palpator 135 and display 180 includes virtual environment 185. In this embodiment, needle-pad device and feedback assembly 114, haptic feedback assembly 130, sensors 140 and 150, and input/output interface 160 are disposed within housing 110.

Housing 110 can be any type of structure that supports a palpation region 112. Housing 110 can also be configured such that several components of training system 100 are disposed outside housing 110. Thus in alternate embodiments, needle-pad device and feedback assembly 114, components of haptic feedback assembly 130, sensors 140, 150, and/or input/output interface 160 can be disposed outside of housing 110.

Figure 2:
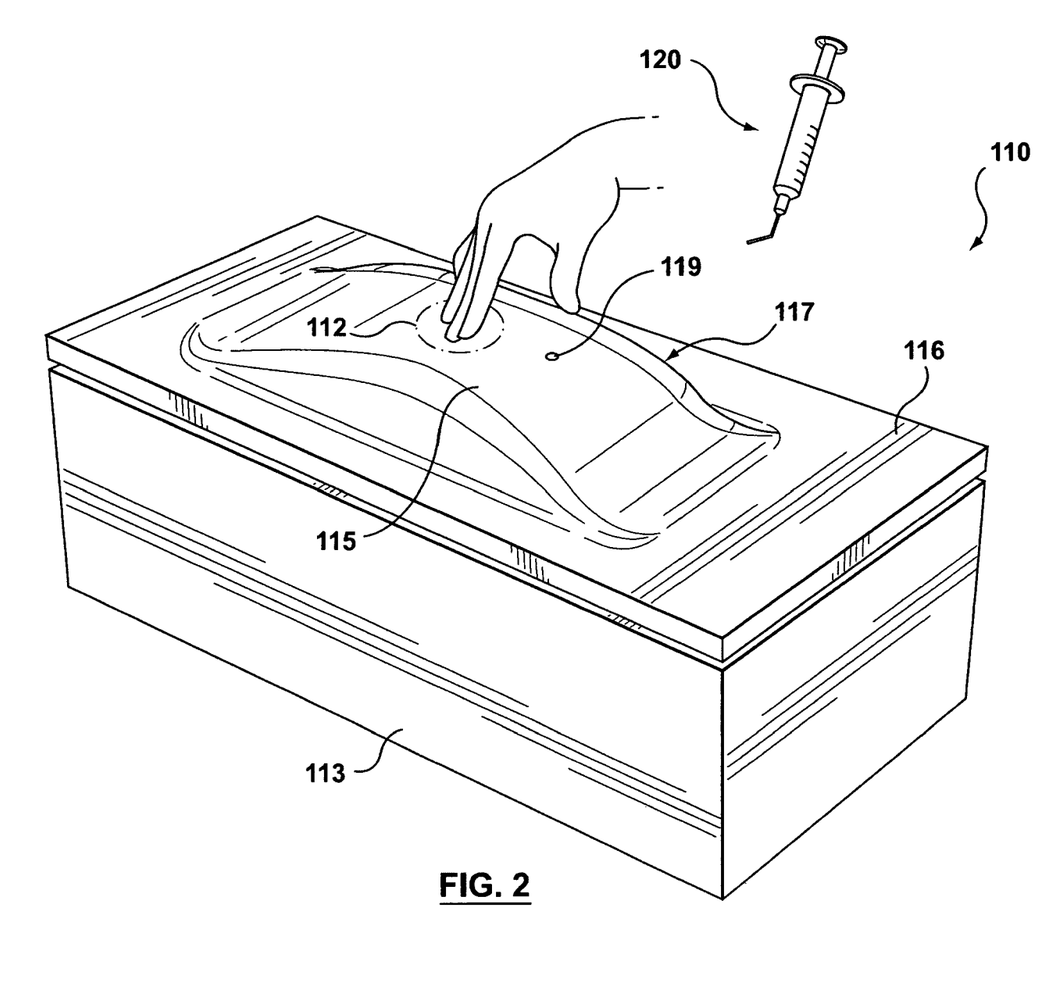
FIG. 2 illustrates a perspective view of a housing configured to simulate a patient's face in accordance with an embodiment hereof.

FIG. 2 illustrates an embodiment of housing 110 configured to simulate a patient's face in accordance with an embodiment hereof. In other embodiments, the anatomical structure can simulate other body portions of a simulated patient, such as any other portion that would be desirably treated with dermal filler. Housing 110 includes a base portion 113, a top portion 116, and an anatomical structure 117 extending from top portion 116. Anatomical structure 117 includes a flexible outer membrane or covering 115 with palpation region 112 that simulates tissue such as skin and provides a mock or fake skin surface to a user. In an embodiment, outer membrane 115 may be made of a flexible material such as a synthetic rubber, for e.g., neoprene, with or without a fabric-covering to simulate a patient's epidermis that overlays a thin foam layer to simulate a patient's dermis. Anatomical structure 117 may include an internal frame having solid portions that support outer membrane 115 and includes at least one opening 119 in outer membrane 115 through which a user can access needle-pad device and feedback assembly 114 with injection simulator 120 to provide the simulated injectable dermal filler.

In an embodiment, needle-pad device and feedback assembly 114 may be adapted from the Virtual IV product system manufactured by Immersion, Inc. of San Jose, Calif. A user selects an injection site in the system software and inserts the needle of injection simulator 120 into opening 119 where the needle enters needle pad device and feedback assembly 114, which tracks an azimuth (yaw), elevation (pitch) and insert depth of the needle. Force feedback is provided to the user through needle pad device and feedback assembly 114 such that the user feels the pierce of the dermal layers and entry into the tissue. In another embodiment, the vascular access simulation system shown and described in U.S. Pat. No. 6,470,302 to Cunningham et al., which is incorporated by reference here in its entirety, may be adapted by one of ordinary skill in the art for use as a needle-pad device and feedback assembly in accordance with embodiments hereof.

Figure 3:
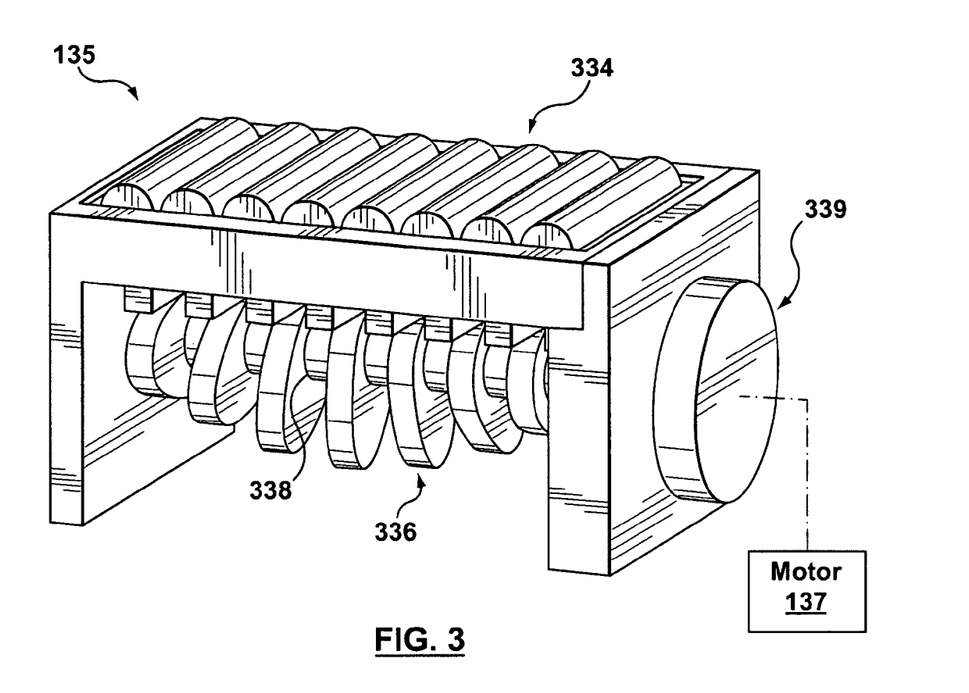
FIG. 3 illustrates a cam palpator in accordance with an embodiment hereof with all lifters in an even, planar configuration.
Figure 4:
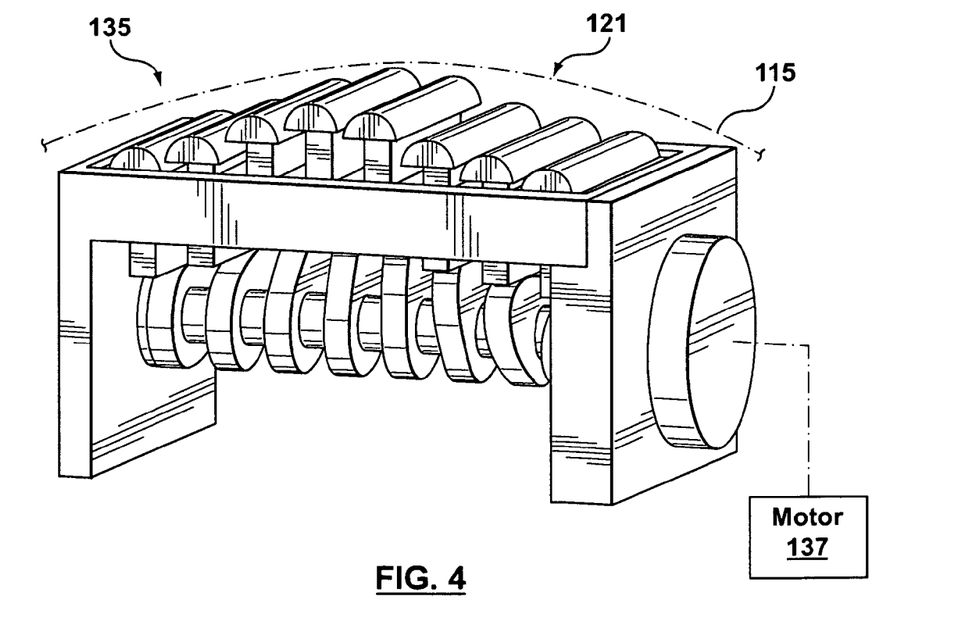
FIG. 4 illustrates the cam palpator of FIG. 3 with a portion of the lifters in a raised configuration to simulate a wheal of injected substance.

Haptic feedback assembly 130 provides haptic feedback to palpation region 112. Feedback assembly 130 includes a motor 137 for driving cam palpator 135, as shown in FIGS. 3 and 4. Cam palpator 135 is situated within housing 110 under palpation region 112 to selectively provide a raised feature 121 in outer membrane 115, as shown in FIG. 4. Raised feature 121, which projects from anatomical structure 117, is intended to simulate a wheal created by injected dermal filler and may be palpated and manipulated by a user. Raised feature 121 is created by a set of lifters 334 of cam palpator 135 that are in a raised configuration (as shown in FIG. 4) by operation of a corresponding set of cams 336 on a cam shaft 338 of cam palpator 135. Each lifter in the set of lifters 334 may be sequentially raised and lowered as cam shaft 338 is rotated, to thereby provide a variety of raised configurations. A drive end 339 of camshaft 338 is operably connected to a drive shaft of a motor 137, such as, for e.g., a Maxon Motor model 111783 available from Maxon Motor, Ag of Switzerland. Motor 137 can be connected directly to cam shaft 338, such as with a shaft coupler, for e.g., a McMaster-Carr shaft coupler model 9845T2 available from McMaster-Carr Supply Company of Elmhurst, Ill., or through a drive train or gearbox with a 1:1 ratio for back driveability. A position sensor 150 is operably coupled to motor 137 and is configured to send a signal based on a position of the motor's drive shaft to processor 170 via input/output interface 160. In an embodiment, position sensor 150 may be an incremental rotary encoder, such as a two piece optical encoder having a codewheel and a reader available from US Digital of Vancouver, Wash. In various other embodiments, position sensor 150 may be a potentiometer, an accelerometer, resolver or an inclinometer. Motor 137 is back-drivable such that, along with the back-drivability of cams 336 of cam palpator 135, a user applying an external force in palpation region 112 is permitted to move or manipulate raised feature 121, i.e., lifters 334, to simulate pushing dermal filler under the simulated skin and thereby return lifters 334 to a planar configuration, as shown FIG. 3.

Processor 170 includes a simulation program that is provided a signal from sensor 140 after injection simulator 120 is used to administer a simulated injection of dermal filler to needle pad device and feedback assembly 114. In response thereto, processor 170 generates an output that directs motor 137 to rotate cam shaft 338 to a predetermined position that orients the set of lifters 334 to produce a raised feature or simulated wheal 121. Once raised feature 121 is produced, motor 137 holds the predetermined position of cam shaft 338 thereby keeping lifters 334, and thus raised feature 121, stationary under palpation region 112. In the simulation program, one or more signals from position sensor 150 relate to a rotational position of motor 137 that is correlated to one or more predetermined rotational positions of cam shaft 338 with corresponding orientation(s) of lifters 334. If processor 170 receives a signal from position sensor 150 that is generated due to reverse motion on cam shaft 338, and in turn the drive shaft of motor 137, sensed by position sensor 150, the simulation program assumes that a user is applying an external force, i.e., is pushing on simulated wheal 121 one way or another, and in response thereto processor 170 generates an output that directs motor 137 based on the rules in the simulation to provide haptic feedback through simulated wheal 121 of haptic feedback assembly 130 permitting manipulation thereof or not, and/or by allowing the manipulation to proceed quickly or slowly. The simulation program includes visual rendering of the anatomy, such as visual rendering of the anatomy proximate an injection site, physical rendering of the underlying anatomy including the physical properties related to skin, cartilage, bone, muscle, and other tissue, reading data received from the position sensor of the cam palpator, and outputting data for controlling the cam palpator. In addition, the simulation program includes parameters related to, but not limited to, the amount of dermal filler material injected, the anatomical features around the injection site, the physical properties of the dermal filler material such as viscosity, and the rate of injection. These parameters are inputs to model that control the behavior of the feedback assemblies 114, 130. As such, the simulation program may provide the user the feel, e.g., greater resistance to smoothing out of the simulated wheal at a simulated injection site over bone or cartilage or due to a thicker and/or greater amount of dermal filler being injected requiring the user to exert more of a force against the palpation region to "smooth out" the simulated wheal.

A simulation program as described in U.S. Pat. No. 7,289,106 to Bailey et al, which is incorporated by reference here in its entirety, may be adapted by one of ordinary skill in the art for use in accordance with embodiments hereof.

Figure 5:
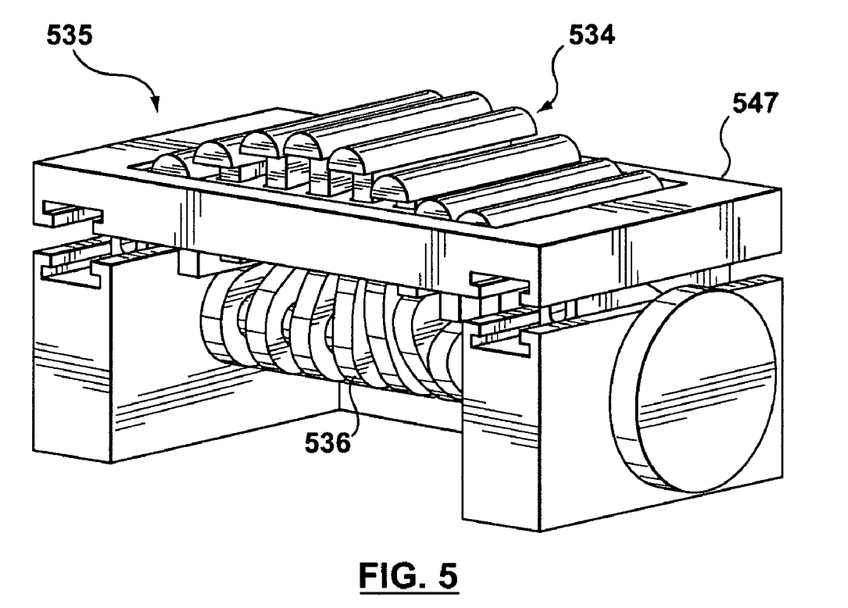
FIGS. 5 and 5A illustrate a cam palpator in accordance with another embodiment hereof.
Figure 5A:
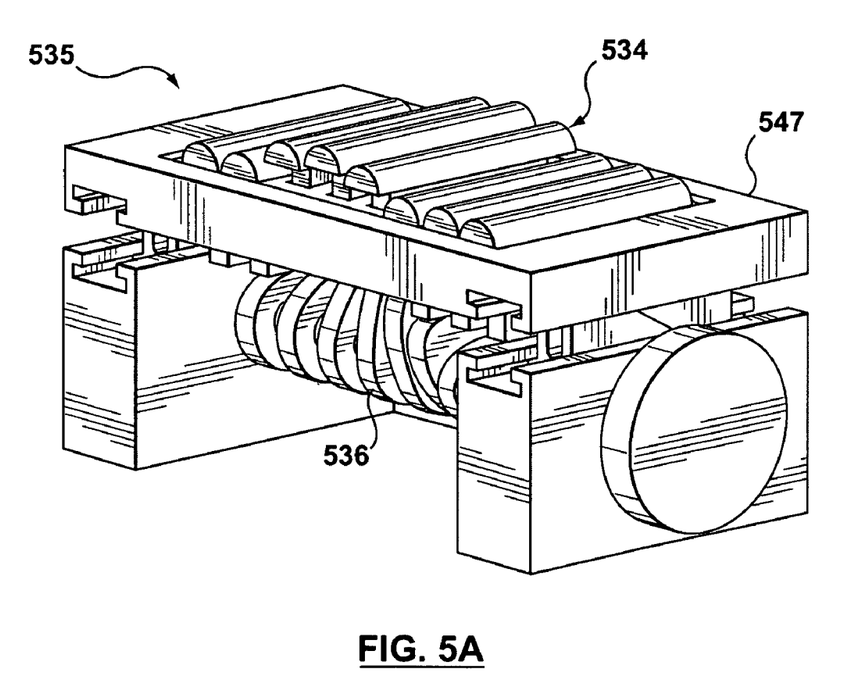

In another embodiment shown in FIGS. 5 and 5A, a cam palpator 535 includes a bracket 547 that holds lifters 534. Lifter bracket 547 may be raised or lowered to control the engagement of cams 536 with their respective lifters 534. Lifter bracket 547 is raised or lowered by an actuation mechanism (not shown) that includes two inclined planes and a screw such that when the screw is tightened or loosened the planes ride against each other causing the distance between cams 536 and lifter bracket 547 to change. In an embodiment, the screw of the actuation mechanism may be attached to a motor and sensor such that the simulation program may be used to control the actuation mechanism by computer. In FIG. 5, lifter bracket 547 is lowered, or closer to the cam shaft, to thereby permit lifters 534 to engage more fully with cams 536 and to be raised higher relative to lifter bracket 547 to thereby display a larger raised feature or simulated wheal. In FIG. 5A, lifter bracket 547 is raised, or moved away from the cam shaft, to thereby limit engagement of lifters 534 with cams 536 such that lifters 534 are only slightly raised relative to lifter bracket 547 to thereby display a smaller, more subtle raised feature or simulated wheal. In the embodiment of FIGS. 5 and 5A, a servo-motor may be operably coupled to cam palpator 535 to actuate cams 536.

Figure 6:
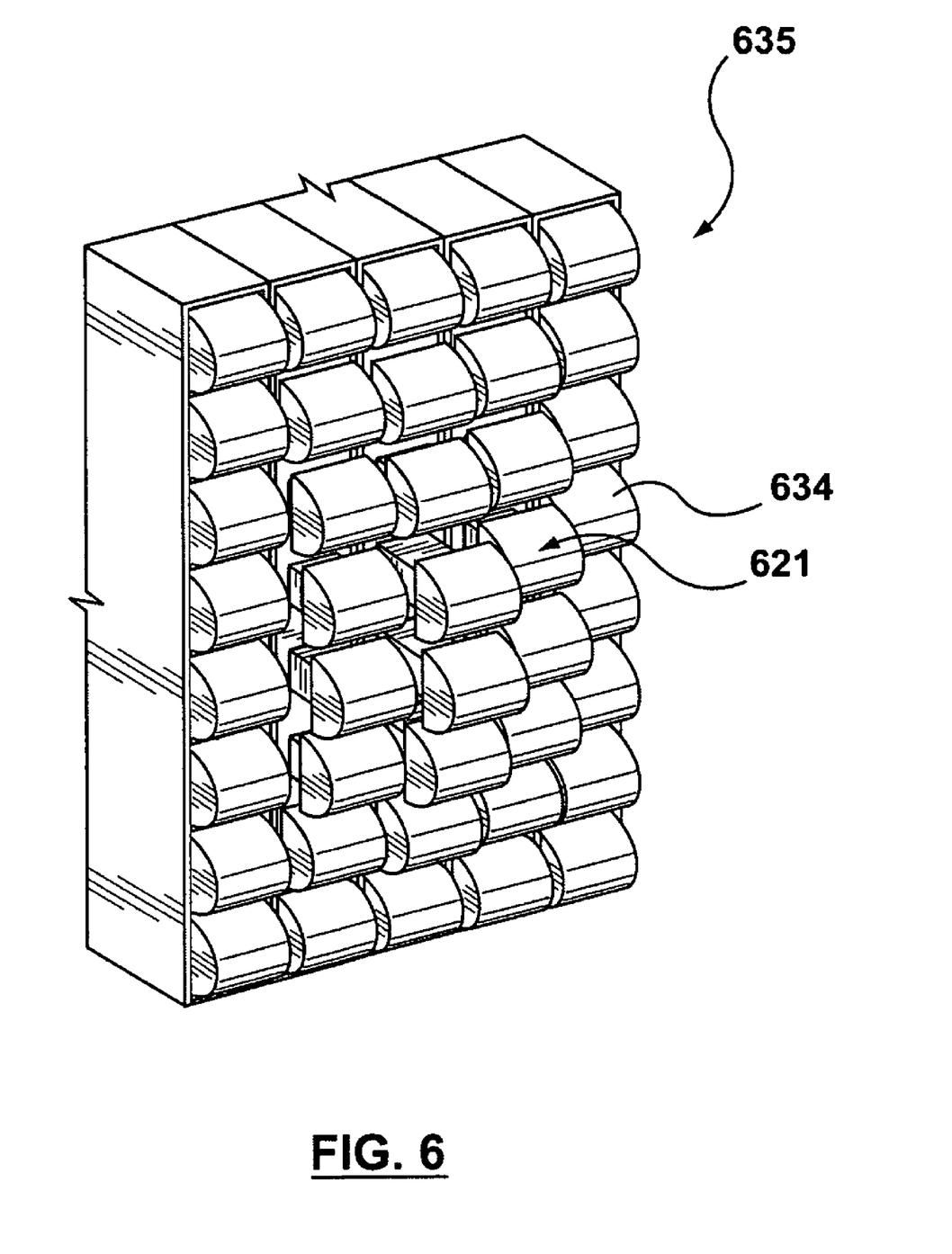
FIG. 6 illustrates a top perspective view of a cam palpator in accordance with another embodiment hereof.
Figure 6A:
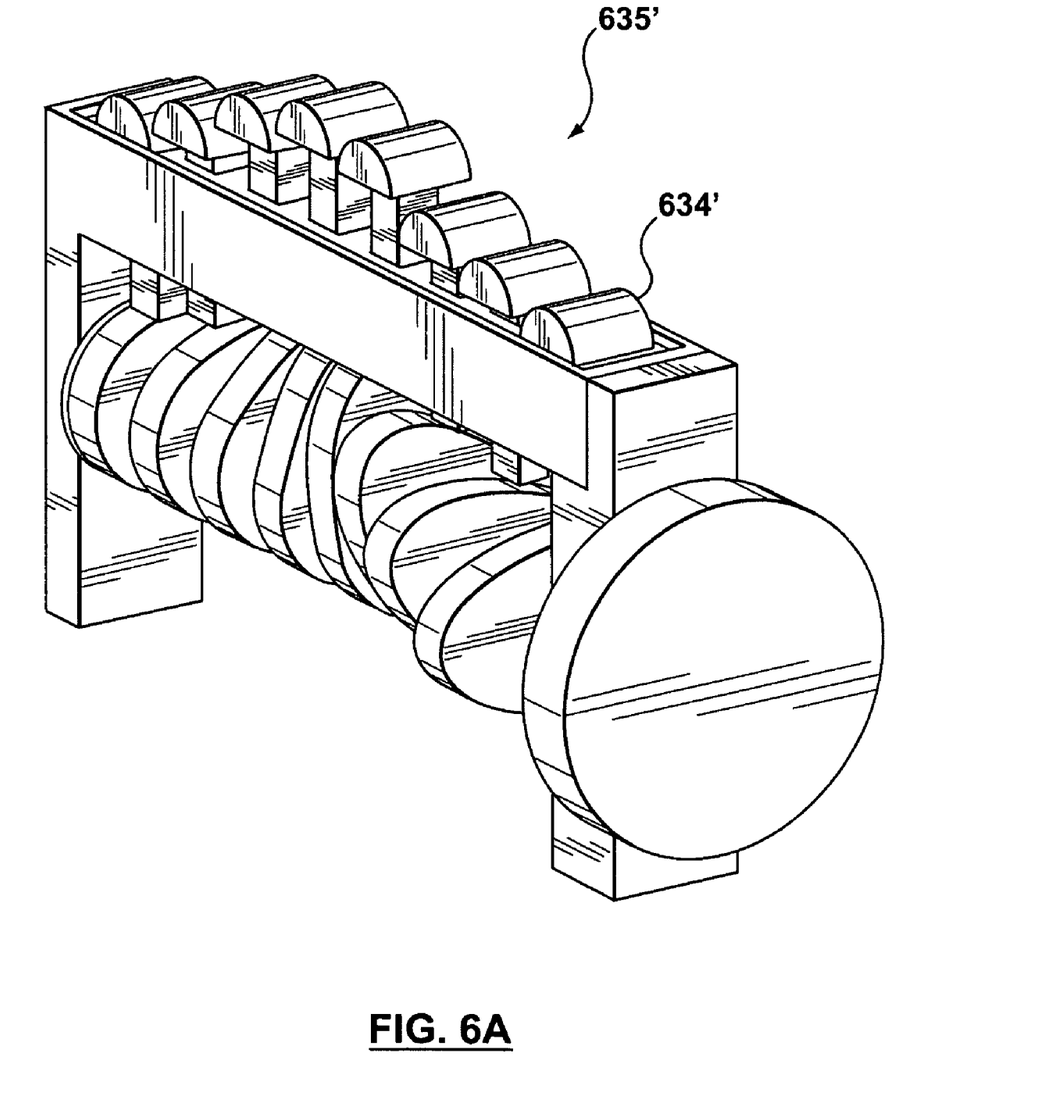
FIG. 6A illustrates a perspective side view of a cam palpator in accordance with another embodiment hereof.

FIG. 6 illustrates a top perspective view of a cam palpator 635 for use as a haptic feedback assembly in accordance with another embodiment hereof. Cam palpator 635 includes an array of pinpoint-like lifters 634 arranged in separately controlled rows, each row being connected to a motor (not shown) and a sensor or optical encoder (not shown). In such an embodiment, two dimensional manipulation of wheal 621 may be simulated by a user. FIG. 6A is a perspective side view of a cam palpator 635' having square or pin-like lifters 634' that may be used in the array of FIG. 6 or in another haptic feedback assembly.

Processor 170 includes a memory component (not shown in FIG. 1). The memory component may include one or more types of memory. For example, the memory component may include a read only memory (ROM) component and a random access memory (RAM) component. The memory component may also include other types of memory that are suitable for storing data or software in a form retrievable by processor 170. For example, electronically programmable read only memory (EPROM), erasable electronically programmable read only memory (EEPROM), flash memory, as well as other suitable forms of memory may be included within the memory component. Processor 170 may also include a variety of other components, such as for example, co-processors, graphics processors, etc., depending upon the desired functionality of the device.

Figure 7:
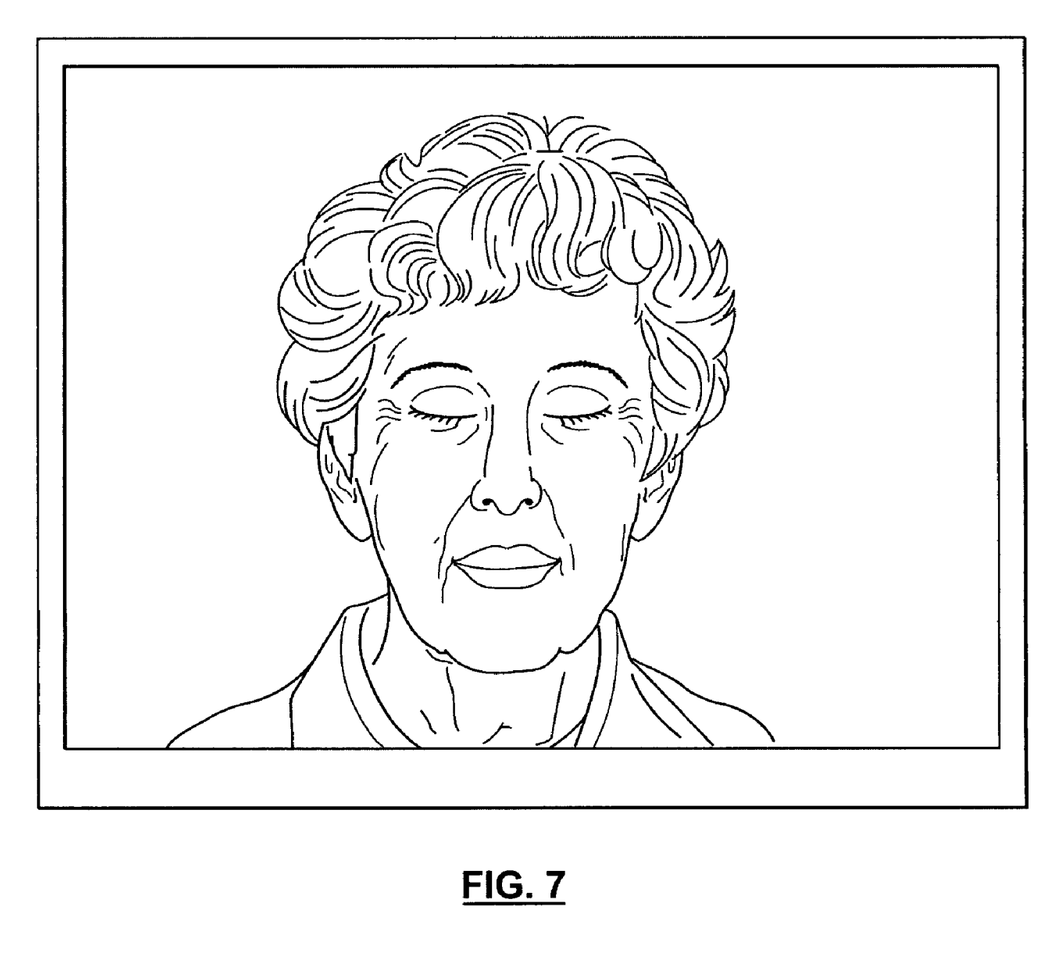
FIG. 7 illustrates an exemplary display of a dermal filler injection training system in accordance with an embodiment hereof.

Training system 100 is configured such that a user (e.g., a medical practitioner or clinician) uses injection simulator 120 and palpates palpation region 112 in conjunction with viewing the virtual environment 185 on visual display 180. In other words, the user receives haptic output at palpation region 112 while also viewing the virtual environment 185, which is provided in coordination with the haptic output. FIG. 7 illustrates an exemplary visual display of a dermal filler injection training system in accordance with an embodiment hereof.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An apparatus for training a medical procedure comprising:
    a needle-pad device and feedback assembly that includes a sensor;
    an outer flexible membrane that simulates skin having a palpation region to be palpated, wherein the needle-pad device and feedback assembly are disposed under the outer membrane;
    an injection simulator, wherein an opening in the outer flexible membrane permits a user to access the needle-pad device and feedback assembly with the injection simulator to administer a simulated injection that is sensed by the sensor of the needle-pad device and feedback assembly;
    a cam palpator having a set of lifters operably contacting a set of cams that are rotated by a cam shaft, wherein the set of lifters are disposed under the palpation region of the outer membrane and wherein the set of lifters form a raised feature in the palpation region to simulate an injected substance in response to the simulated injection;
    a motor having a drive shaft operably coupled to the cam shaft, wherein the motor is back-drivable such that an external force applied to the raised feature moves the lifters to a planar configuration;
    a position sensor operably coupled to the motor and configured to send a signal based on a rotational position of the drive shaft, wherein in response to the signal haptic feedback is provided to the user at the raised feature; and
    a processor that receives the signal from the sensor of the needle-pad device and feedback assembly and generates an output based on a simulation program that directs the motor to rotate the cam shaft to a predetermined position to orient the set of lifters as the raised feature in response to the simulated injection.

2. The apparatus of claim 1, further comprising:
    the processor that receives the signal from the position sensor and generates an output based on a simulation program that directs the motor.

3. The apparatus of claim 2, wherein when the signal from the position sensor indicates reverse motion on the drive shaft due to the application of the external force, the output directs the motor to provide the haptic feedback of a gradual flattening of the raised feature that simulates pushing the injected substance under the simulated skin.

4. The apparatus of claim 3, wherein the gradual flattening of the raised feature moves the lifters to the planar configuration.

5. The apparatus of claim 2, wherein rotation of the cam shaft sequentially raises and lowers each lifter to form a variety of raised features based on the simulation program.

6. The apparatus of claim 2, wherein in the simulation program at least one signal from the position sensor relates to a particular rotational position of the drive shaft that is correlated to a particular rotational position of the cam shaft with a corresponding orientation of the lifters.

7. The apparatus of claim 6, wherein the corresponding orientation of the lifters includes at least a portion of the set of lifters in a raised configuration to create the raised feature.

8. The apparatus of claim 1, wherein the position sensor is an optical encoder.

9. The apparatus of claim 1, wherein the set of lifters are held within a lifter bracket that may be raised or lowered relative to the cam shaft to adjust a height of the raised feature provided by the lifters in the palpation region.

10. The apparatus of claim 1, wherein visual feedback is also provided to the user as a visual display in response to the signal from the position sensor.

* * * * *

UNITED STATES PATENT AND TRADEMARK OFFICE
CERTIFICATE OF CORRECTION

| | |
|---|---|
| PATENT NO. | : 8,342,853 B2 |
| APPLICATION NO. | : 12/431722 |
| DATED | : January 1, 2013 |
| INVENTOR(S) | : Robert Cohen |

Page 1 of 1

It is certified that error appears in the above-identified patent and that said Letters Patent is hereby corrected as shown below:

Column 6, line 48 (claim 2, line 1) delete "further comprising" and replace with -- wherein --.

Column 6, line 49 (claim 2, line 2) delete "that.".

Column 6, line 50 (claim 2, line 3) delete "a simulation" and replace with -- the simulation --.

Signed and Sealed this
Twelfth Day of March, 2013

Teresa Stanek Rea
*Acting Director of the United States Patent and Trademark Office*